United States Patent
Langen et al.

(10) Patent No.: US 9,309,017 B2
(45) Date of Patent: Apr. 12, 2016

(54) ITEM LOADING APPARATUS

(76) Inventors: H. J. Paul Langen, Brampton (CA); Istvan Ungar, Caledon East (CA)

(*) Notice: Subject to any disclaimer, the term of this patent is extended or adjusted under 35 U.S.C. 154(b) by 1314 days.

(21) Appl. No.: 13/033,002

(22) Filed: Feb. 23, 2011

(65) Prior Publication Data

US 2012/0011808 A1 Jan. 19, 2012

Related U.S. Application Data

(60) Provisional application No. 61/307,624, filed on Feb. 24, 2010.

(51) Int. Cl.
| | | |
|---|---|---|
| B65B 43/44 | (2006.01) | |
| B65B 43/14 | (2006.01) | |
| B65B 5/02 | (2006.01) | |
| B65B 43/26 | (2006.01) | |
| B65B 43/52 | (2006.01) | |
| B65G 17/22 | (2006.01) | |

(52) U.S. Cl.
CPC .............. *B65B 43/145* (2013.01); *B65B 5/024* (2013.01); *B65B 43/265* (2013.01); *B65B 43/52* (2013.01); *B65G 17/22* (2013.01)

(58) Field of Classification Search
CPC ........ B65B 43/44; B65B 43/52; B65B 43/60; B65G 17/007; B65G 17/06
USPC .............. 198/406, 408, 413, 803.14, 377.01, 198/176.1, 476.1, 478.1, 404, 405, 379; 53/249, 250, 566
See application file for complete search history.

(56) References Cited

U.S. PATENT DOCUMENTS

| | | | | | |
|---|---|---|---|---|---|
| 3,154,186 | A | * | 10/1964 | Delph ................. | B65G 47/252 198/378 |
| 3,608,701 | A | * | 9/1971 | Dieter ............................ | 198/802 |
| 3,906,705 | A | * | 9/1975 | Beck et al. ...................... | 53/252 |
| 3,961,705 | A | * | 6/1976 | Suciu .............................. | 198/402 |
| 4,173,106 | A | | 11/1979 | Leasure et al. | |
| 4,207,974 | A | * | 6/1980 | Dragotta ........................ | 198/384 |
| 4,401,020 | A | * | 8/1983 | Brux ..................... | B65B 13/022 100/6 |
| 4,483,526 | A | * | 11/1984 | Bulka et al. ............... | 198/377.07 |
| 4,600,065 | A | * | 7/1986 | Morris ........................... | 177/123 |
| 4,608,808 | A | * | 9/1986 | Ryan et al. ..................... | 53/436 |
| 4,642,975 | A | * | 2/1987 | Langen ................. | B65B 59/005 198/836.3 |
| 4,722,433 | A | * | 2/1988 | Gough .......................... | 198/706 |
| 4,730,766 | A | * | 3/1988 | Fear ...................... | B65D 5/067 229/106 |
| 4,862,677 | A | * | 9/1989 | Roberts et al. .................. | 53/498 |
| 4,891,928 | A | * | 1/1990 | James et al. .................... | 53/250 |
| 4,982,556 | A | * | 1/1991 | Tisma ............................ | 53/506 |
| 5,027,586 | A | * | 7/1991 | Ramaker ........................ | 53/458 |
| 5,072,573 | A | * | 12/1991 | Tisma ............................ | 53/252 |

(Continued)

*Primary Examiner* — Gloria R Weeks
(74) *Attorney, Agent, or Firm* — Smart & Biggar

(57) ABSTRACT

A system is disclosed for loading at least one item into each of a plurality of containers. The system includes a plurality of buckets, each configured for supporting at least one container. The system also has a conveyor interconnected to each of the buckets. The conveyor has a conveyor axis of rotation that is oriented at an acute conveyor angle to a horizontal plane. The buckets are oriented relative to the conveyor axis of rotation by a wedge angle. The buckets move in series around the axis of rotation from a first path portion to a second path portion. An inner surface of the container is oriented generally in or parallel to the horizontal plane when the buckets are moved along the first path portion and the inner surface is oriented at an angle to the horizontal plane that is of an amount that is twice the wedge angle when the buckets are moved along the second path portion.

26 Claims, 10 Drawing Sheets

(56) References Cited

U.S. PATENT DOCUMENTS

| | | | | |
|---|---|---|---|---|
| 5,105,933 A | * | 4/1992 | Gough | 198/706 |
| 5,159,796 A | * | 11/1992 | Tas | 53/245 |
| 5,247,778 A | * | 9/1993 | Tisma | 53/167 |
| 5,435,429 A | * | 7/1995 | Van Den Goor | 198/890.1 |
| 5,526,921 A | * | 6/1996 | Kovalak et al. | 198/706 |
| 5,535,999 A | * | 7/1996 | Ford | 271/185 |
| 5,579,890 A | * | 12/1996 | Harris | 198/377.1 |
| 5,778,640 A | * | 7/1998 | Prakken et al. | 53/475 |
| 5,855,105 A | * | 1/1999 | Ferris | 53/475 |
| 5,881,534 A | * | 3/1999 | Ahlqvist et al. | 53/403 |
| 6,006,891 A | * | 12/1999 | Iwano | B65G 47/248 198/404 |
| 6,082,077 A | * | 7/2000 | Christ | 53/250 |
| 6,176,369 B1 | * | 1/2001 | Petrovic | 198/867.11 |
| 6,202,392 B1 | * | 3/2001 | Greenwell et al. | 53/566 |
| 6,267,226 B1 | * | 7/2001 | Jarmain | 198/701 |
| 6,273,237 B1 | * | 8/2001 | Bazydola | B65G 47/244 198/375 |
| 6,293,387 B1 | * | 9/2001 | Forster | 198/377.02 |
| 6,374,997 B1 | * | 4/2002 | Spadafora et al. | 198/803.11 |
| 6,390,276 B1 | * | 5/2002 | Haug et al. | 198/377.01 |
| 6,435,332 B1 | * | 8/2002 | Price | 198/375 |
| 6,520,314 B1 | * | 2/2003 | Seiling | 198/375 |
| 6,562,258 B1 | * | 5/2003 | Elsome et al. | 252/188.28 |
| 6,698,163 B2 | * | 3/2004 | Greenwell | B65B 25/141 53/429 |
| 6,959,525 B2 | * | 11/2005 | Prakken | 53/447 |
| 7,025,192 B2 | * | 4/2006 | Hoeg et al. | 198/375 |
| 7,137,234 B2 | * | 11/2006 | Caporali et al. | 53/433 |
| 7,326,165 B2 | | 2/2008 | Baclija et al. | |
| 7,475,520 B2 | * | 1/2009 | Swider et al. | 53/55 |
| 7,856,797 B2 | * | 12/2010 | Black et al. | 53/447 |
| 8,607,960 B1 | * | 12/2013 | Bliss et al. | 198/394 |
| 8,689,530 B2 | * | 4/2014 | Prahm et al. | 53/475 |
| 2004/0245068 A1 | * | 12/2004 | Spatafora et al. | 198/408 |
| 2007/0079575 A1 | | 4/2007 | Monti | |
| 2009/0277133 A1 | * | 11/2009 | Yokota et al. | 53/244 |
| 2012/0083920 A1 | * | 4/2012 | Suyama et al. | 700/230 |

* cited by examiner

ITEM LOADING APPARATUS

CROSS-REFERENCE TO RELATED APPLICATION

This application claims priority from U.S. provisional application No. 61/307,624, filed Feb. 24, 2010, the contents of which are hereby incorporated herein by reference.

TECHNICAL FIELD

This invention relates to an apparatus for loading one or more items into each of a plurality of containers. The containers may be cartons.

BACKGROUND

Various types of apparatuses are known for loading one or more items into containers. The items may be any kind of thing or product that one wishes to place into a container. One such type of apparatus is generally known as a cartoner. Cartoners may include components that are used to form and/or erect a plurality of cartons and subsequently load one or more items into each of the cartons. Cartoners that are known generally as vertical cartoners are well known. Also well known are what are generally referred to as horizontal cartoners. The vertical/horizontal orientation designation of such cartoners generally reflects the orientation of the cartons at the time at which items are being loaded into the cartons. Horizontal cartoners are generally configured quite differently to vertical cartoners.

In a vertical cartoner, the cartons may be formed from flat blanks. The blanks may be transformed into cartons having upwardly facing openings using carton erecting machines, such as machines of a vertical die and plunger type. In general, a reciprocating vertical plunger may move in a vertical direction, and force a flat carton blank through a carton forming die. Components of the die, in whole or in part, may fold the side and end panels of the blank around the reciprocating plunger as the plunger passes downwardly through the die, and may erect the side end panels of the vertical carton such that the carton has an upwardly facing open end. The panels may be sealed with an adhesive and then the cartons may in turn be ejected from the carton former and transferred to a conveyor. The cartons with vertically upward oriented openings and with bottom panels sealed may thereafter be moved typically upon a separate conveyor, to an item loading station. At the item loading station, one or more items are loaded vertically (usually at least in part with the assistance of gravity) through the openings into the cartons. Once the items are loaded, the top panels may be sealed and the sealed carton is ready to be discharged from the loading system. Certain products, such as bottles, as well as loose products like cereal, rice, pasta, sugar, flour, cat litter, as well as products such as liquid filled bags, and garbage bags, are all well suited for vertical loading. Also, vertical cartoners have significant benefits during the item loading process including as indicated above, being able to make use of gravity. However, being able to form, orient and hold the carton during loading in a vertical orientation typically requires relatively complex equipment. As a result, vertical cartoners are often less desirable than horizontal cartoners. Nevertheless, vertical cartoners are still preferred or required in certain applications, such as where the items to be packaged do not lend themselves to being readily filled horizontally with a horizontal cartoner. Also, in vertical cartoners, the full circumference of the conveyor can be utilized whereas typically only the top section of a horizontal cartoner is utilized. Also, in vertical cartoners, an item retention device, such as a guide rail, may not be required once the carton has been loaded. Consequently, it may be simpler to fold and seal the flaps while the items to be packaged are already loaded in the carton as it is not necessary to accommodate an item retention device.

Horizontal cartoners, on the other hand, may be simpler compared to vertical cartoners in at least some aspects of their construction and/or operation and may be able to operate at higher rates. This is in part because horizontal cartoners may make use of a single continuously moving conveyor system for the movement of a carton during the erection, placement, loading, sealing and discharge steps. Horizontal cartoners may use cartons blanks that are generally supplied as a flattened blank but that may be folded over such that they form a flattened, generally tubular shape with a main longitudinal sealed seam along the length of the carton blank. Horizontal cartoners normally include a magazine holding a supply of such flattened tubular carton blanks, and an apparatus for retrieving a plurality of carton blanks in series from the magazine, erecting them into a generally tubular form, and then placing each carton in succession into a bucket carried on a bucket conveyor. Each bucket is configured in any number of different ways to hold a carton in the erected state. The carton conveyor will then move the bucket with the carton held therein to an item loading station where one or more items can be loaded. The carton erection and placement into a conveyor may generally be easier and faster than in vertical cartoners. However, as the items have to be loaded horizontally into horizontally oriented openings of each carton, the horizontal cartoner may in some applications need to employ a series of push members or other devices to push the items from a separate item carrying conveyor horizontally into the carton. Thus, while horizontal cartoners may have benefits in the way in which the cartons may be retrieved and erected and placed onto a conveyor for loading of items, the actual loading of certain types of items horizontally can pose challenges or be practically impossible.

There is thus a desire for an improved apparatus and method for vertically loading one or more items into a container such as a carton.

SUMMARY OF THE INVENTION

According to an aspect of the present invention there is provided a system for loading at least one item into each of a plurality of containers, the system comprising: (i) a plurality of buckets, each of the plurality of buckets configured for supporting at least one container, the container having at least one side wall with an inner surface and at least one end opening; (ii) a conveyor being interconnected to each of the plurality of buckets, the conveyor being operable to move the plurality of buckets in series along a first path portion and a second path portion; the conveyor having a conveyor axis of rotation, the axis of rotation of the conveyor being oriented at an acute conveyor angle to a horizontal plane; the buckets being oriented relative to the conveyor axis of rotation by a wedge angle; the conveyor being configured and operable to rotate each of the plurality of buckets in series around the axis of rotation from the first path portion to the second path portion; wherein the at least one inner surface of the container is oriented generally in or parallel to the horizontal plane when the buckets are moved along the first path portion and wherein the at least one inner surface is oriented at an angle to the horizontal plane that is of an amount that is twice the wedge angle when the buckets are moved along the second path portion.

According to another aspect of the present invention there is provided a system for loading at least one item into a container comprising: (a) a plurality of buckets, each of the plurality of buckets configured for supporting at least one of a plurality of containers, each of the plurality of containers having at least one side wall with an inner surface and at least one end opening; (b) a conveyor being interconnected to each of the plurality of buckets, the conveyor being operable to move the plurality of buckets in series along a first path portion and a second path portion; the conveyor having an axis of rotation, the axis of rotation of the conveyor being oriented at a conveyor angle to a horizontal plane; the conveyor being configured and operable to move each of the plurality of buckets in series around the axis of rotation from the first path portion to the second path portion; the at least one end opening being oriented in a generally horizontal direction when the buckets are moved along the first path portion and each the end openings is generally oriented in a second direction that is separated from the first direction by an amount that is twice the conveyor angle when the buckets are moved along the second path portion.

According to yet another aspect of the present invention there is provided a system for loading at least one item into each of a plurality of containers, the system comprising: (a) a plurality of buckets, each of the plurality of buckets configured for supporting at least one containers; (b) a conveyor being interconnected to each of the plurality of buckets, the conveyor being operable to move the plurality of buckets in series along a first path portion and a second path portion; the conveyor having an axis of rotation, the axis of rotation of the conveyor being oriented at an acute conveyor angle to a horizontal plane; the conveyor being configured and operable to move each of the plurality of buckets in series around the axis of rotation from the first path portion to the second path portion; the system being configured such that each container moving along the first path portion is oriented generally parallel to aid horizontal plane when each the bucket supporting the container is moved along the first path portion and each container is oriented at an angle to the horizontal plane that is of a size that is twice the conveyor angle when the buckets are moved along the second path portion.

According to a further aspect of the present invention there is provided a system for loading at least one item into each of a plurality of containers, the system comprising: (a) a plurality of buckets, each of the plurality of buckets configured for supporting at least one of a plurality of containers, each of the plurality of containers having at least one side wall with an inner surface and at least one end opening; (b) a conveyor being interconnected to each of the plurality of buckets, the conveyor being operable to move the plurality of buckets in series along a first path portion and a second path portion; the conveyor being oriented at an acute conveyor angle to a plane oriented in a first direction; the conveyor being configured and operable to rotate each of the plurality of buckets around an axis of rotation from the first path portion to the second path portion; wherein the at least one inner surface of the container is oriented generally parallel to the first plane when the buckets are moved along the first path portion and wherein the at least one inner surface is oriented at an angle to the plane when the buckets are moved along the second path portion.

According to a still further aspect of the present invention there is provided a method of loading at least one item into a container comprising: (i) providing a plurality of buckets, each of the plurality of buckets adapted for supporting a container; (ii) moving the plurality of buckets in series along a first path portion such that the container is oriented generally parallel to a horizontal plane; (iii) rotating the plurality of buckets in series around an axis of rotation, the axis of rotation being at a first angle to the horizontal plane; (iv) moving the plurality of buckets in series along a second path portion such that containers are oriented generally at an second angle to the horizontal plane.

According to another aspect of the present invention there is provided a system of loading at least one item into a container, the system comprising: (a) a plurality of buckets, each of the plurality of buckets adapted for supporting a container; (b) a moving apparatus for moving the plurality of buckets, while holding a container, in series along a first path portion such that the container is oriented generally parallel to a plane; (c) a rotating apparatus for rotating the plurality of buckets in series around an axis of rotation while holding the container, the axis of rotation being oriented at a first angle to the plane; (d) a moving apparatus for moving the plurality of buckets in series along a second path portion such that containers are oriented generally at a second angle to the plane.

These and other features, aspects, and advantages of the present invention will become better understood with reference to the following description in conjunction with the drawings.

BRIEF DESCRIPTION OF THE DRAWINGS

In drawings illustrating, by way of example only, embodiments of the invention:

FIG. 3b is a top, front right side perspective view of the apparatus of FIG. 3a.

FIG. 4a is a top, front left side perspective view of the apparatus of FIG. 3a.

FIG. 4b is a top, rear left side perspective view of the apparatus of FIG. 3a.

FIG. 5 is a schematic right side elevation view of the apparatus of FIG. 3a.

FIG. 6 is a detailed cross section elevation view at 6-6 in FIG. 4a.

DETAILED DESCRIPTION

Figure 1:
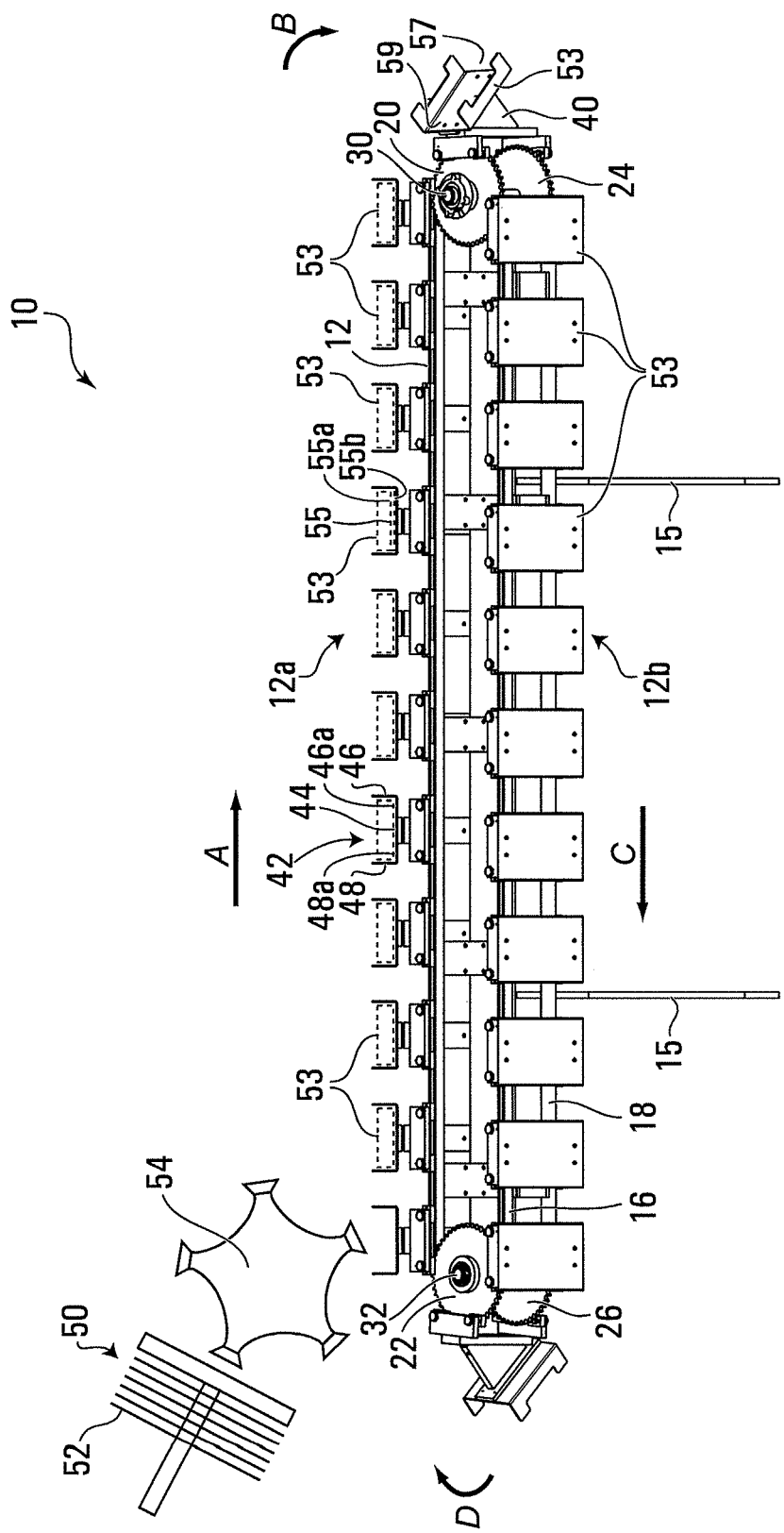
FIG. 1 is a schematic front elevation view of an inclined conveyor for use as part of a vertical cartoner, shown with a magazine and a rotary carton feeder.
Figure 2:
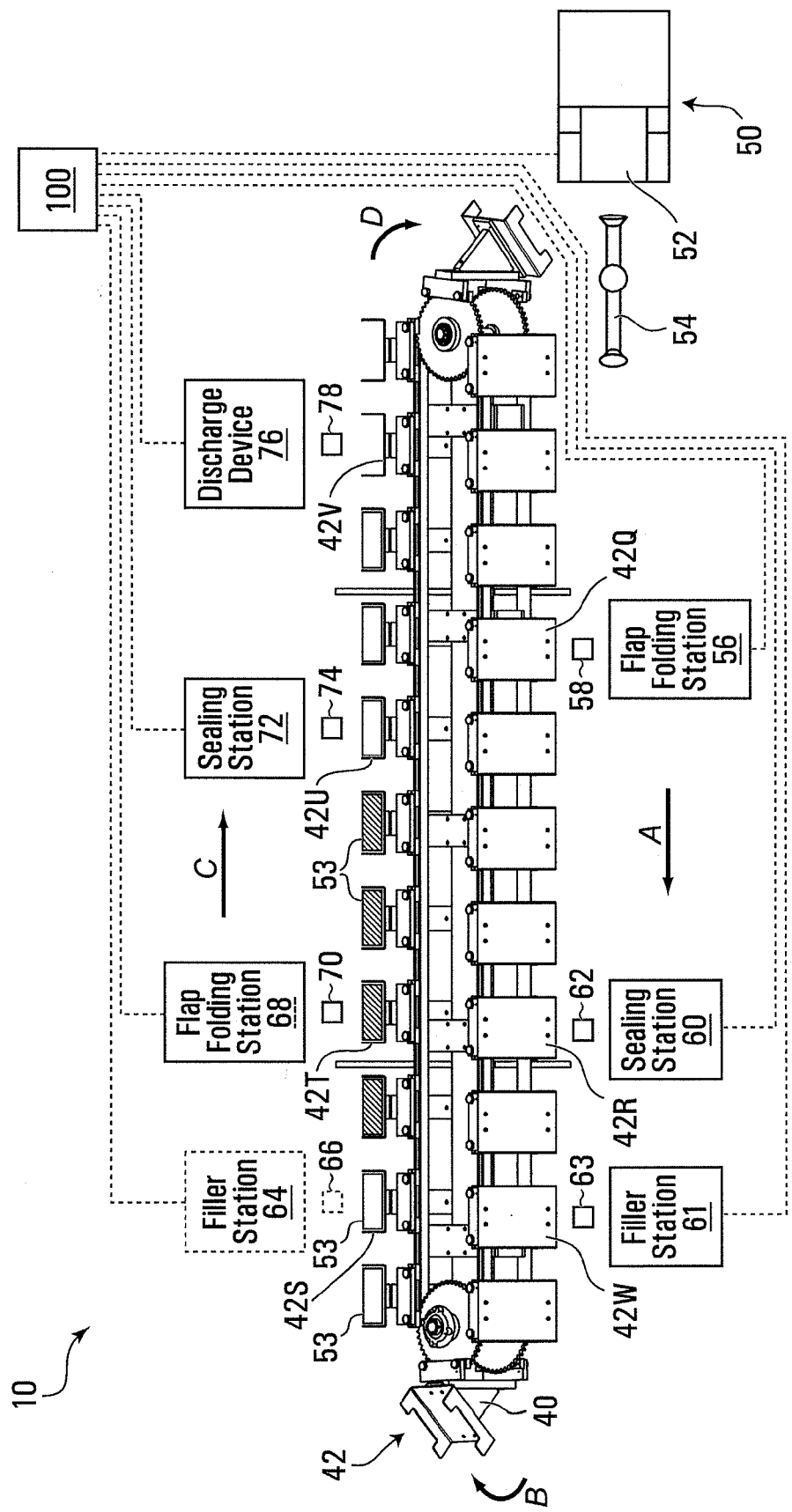
FIG. 2 is a schematic top plan view of the apparatus of FIG. 1, additionally shown schematically with auxiliary stations such as flap folding stations, sealing stations, optional item loading stations and a discharge device.

With reference to FIGS. 1 and 2, an item loading system such as a cartoner 10 may include a conveyor unit 12 mounted on a support frame 14. Support frame 14 may include legs 15 interconnected by a support plate (not shown). Support plate of the support frame 14 may be attached to a longitudinally extending side plate 17 (see FIG. 6) that is part of conveyor unit 12.

All the various components and stations of cartoner 10 may be controlled by a programmable logic controller 100 (see FIG. 2) which may, for example, be a model Control Logix PLC made by Allen Bradley.

Figure 3A:
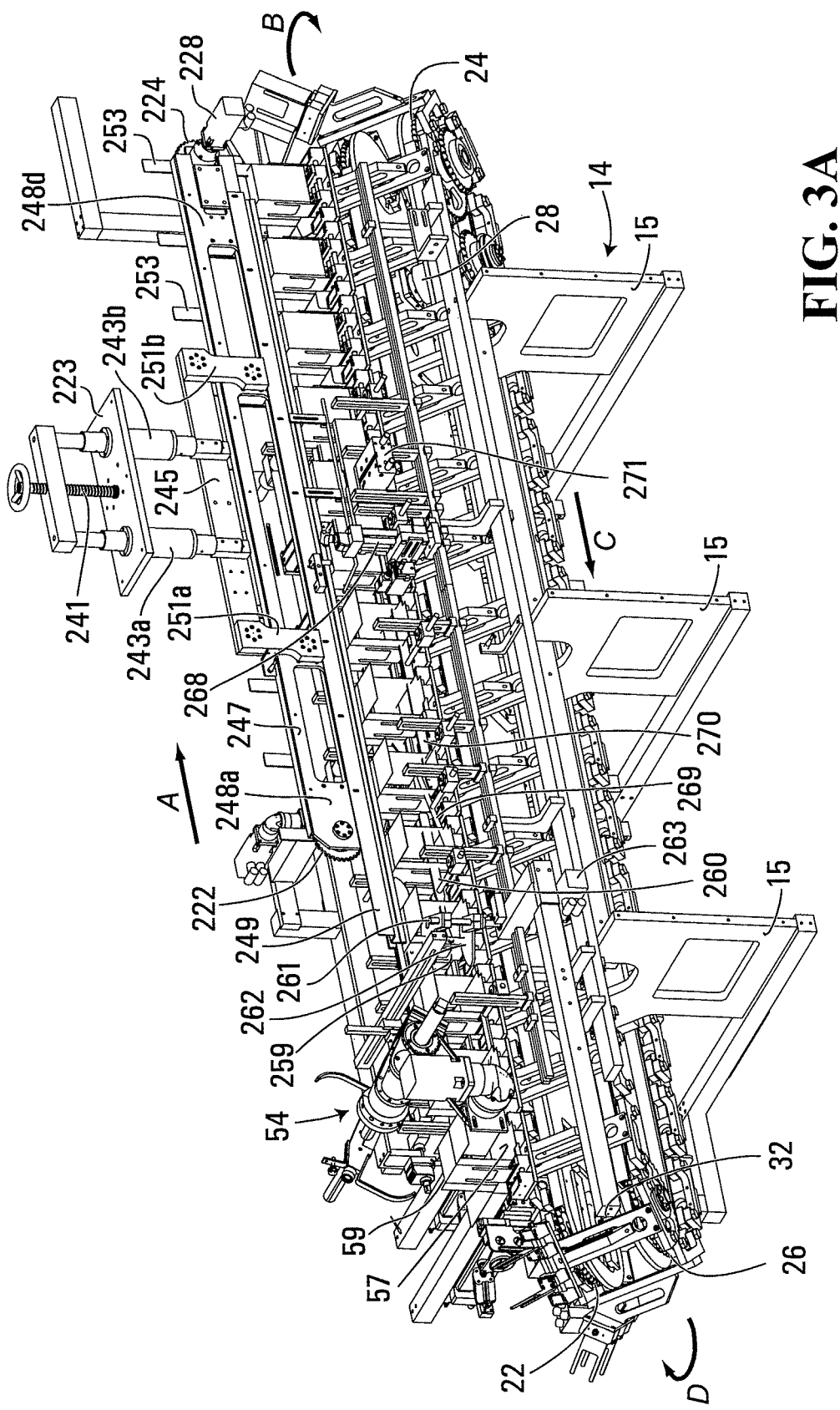
FIG. 3a is a detailed top, rear right side perspective view of the apparatus of FIG. 2.

Conveyor unit 12 may have conveyor components such as chains 16 and 18 and associated rotatable sprockets 20, 22, 24 and 26, that may be held in position by several plates and other components. Instead of drive chains 16 and 18, conveyor 12 may employ other kinds of drive belt type mechanisms. The drive sprockets 20, 24 and thus chains 16 and 18 may be driven by a motor 28 (see FIGS. 3a, 4a and 4b). Each of a plurality of buckets 42 may be mounted in series on chains 16 and 18 of the conveyor 12 with a mounting block/connector member 34 and conveyor mounting plate 36 (see FIG. 5). In this document the term "bucket" includes any one or more components that co-operate to hold a carton 53. Chains 16 and 18, along with sprockets 20, 22, 24 and 26 may be interconnected and mounted to a series of supporting elements such as the longitudinally extending side plates 17 (see FIG. 7). Plates 17 may be attached on opposite transverse sides of and to a central, longitudinally extending core beam member 19. The result is a conveyor unit 12 that can move a plurality of buckets 42 along a continuous path defined by the paths of chains 16 and 18 and the configuration of connector members 34.

Conveyor 12 may be used in synchronization and combination with other packaging related equipment to form a cartoner 10. As shown in FIGS. 1 and 2, the cartoner 10 may be equipped with a carton magazine 50 operable to hold a stack of horizontal carton blanks 52 that are discharged therefrom. Further, carton feeder 54 such as the feeder described in U.S. Pat. No. 7,326,165 issued Feb. 5, 2008 to Baclija et al., the contents of which are hereby incorporated by reference, may be used to retrieve blanks 52 in series and erect a horizontal carton into a tubular format with a first open end 57 with major and minor end flaps, and a second open end 59 with major and minor end flaps, and place the erected carton 53 into a bucket 42 carried on the horizontal first path portion 12A. However, it is understood that any suitable carton magazine and carton feeder apparatus may be used in conjunction with conveyor 12 to retrieve, erect and place an erected carton 53 on conveyor 12. Once each carton 53 is erected and placed in and supported by a bucket 42, carton 53 may be generally tubular in shape and have a plurality of interconnected side wall panels forming a side wall 55, with the side wall having an inner surface 55a and an outer surface 55b. Each carton 53 may also have opposed first and second end openings with adjacent major and minor flaps that may be folded and glued to seal the openings.

Conveyor 12 may thus provide for the buckets 42 attached thereto a first path portion 12A extending in the direction A from sprockets 22 and 26 proximate the magazine 50 and carton feeder 52 to sprockets 20 and 24. Along the first path portion 12A of buckets 42 carried on conveyor 12, there may be a first flap folding station 56 to fold the end flaps at a first end 57 of each horizontal carton 53 and a sealing station 60 to seal those folded end flaps at the first end 57 of each carton 53. Such stations may be configured in a manner known to those skilled in the art in horizontal type carton machines.

The chains 16, 18 of conveyor 12 may then turn round sprockets 20, 24 respectively in direction B, then commence moving buckets 42 in a return direction providing second path portion 12B for buckets 42, commencing at the end of first path portion 12A at sprockets 20, 24 and extending in direction C towards sprockets 22, 26. Along the length of second path portion 12B may be an item loading station 64 that is operable to vertically load one or more items into a vertically oriented carton. Item loading station 64 may be by way of example only, a liquid soap bag filler. For example, a model PJ733 made by ABCO may be employed at item loading station 64 to vertically load items such as liquid soap bags into a carton 53. Such a turret style machine may eject four bags in every fifteen seconds then rotate to the next set of bags ready to be dropped. In the meantime, the cartoner 10 may be configured to index the corresponding number of empty buckets to loading station 64 to accept the next load of four bags.

In the apparatus depicted in FIGS. 3a-4b and 6, the loading station 64 may be configured to load into each carton 53 a composite package 55 of several beverage bottles (e.g. bottles containing a sports drink). The loading station 64 may be able to process two cartons 53 at the same time while the conveyor 12 and the buckets 42 at that station remains stationary for a short period of time.

Also along conveyor path portion 12B may be a further flap folding station 68 that may be operable to fold the end flaps at a second end 59 of the horizontal carton 53, opposite to the first end 57. Again, the end flaps of a group of cartons, for example two cartons, may be folded contemporaneously at station 68. After folding station 68 along path portion 12B may be a further flap sealing station 72 to seal the folded end flaps of the second end 59 of each carton 53 by known means. It should be noted that each flap folding station 56 and 68 and its associated sealing station 60 and 72, may be combined into a single station whereby the folding and sealing of flaps occurs generally concurrently. Apparatuses to achieve the closing and sealing of an upper, vertically oriented opening of a carton 53 may be combined and configured in various ways in a manner well known to those skilled in the art.

After the buckets 42 finish moving along second path portion 12B, the chains 16, 18 of conveyor 12 are then rotated around sprockets 22, 26 in direction D to complete the cycle path. This returns the buckets 42 from path portion 12B to path portion 12A.

Each of the aforementioned folding, sealing and item loading stations may each be equipped with sensors, such as sensor 58 (for flap folding station 56), sensor 62 (for sealing station 60), sensor 66 (for item loading station 64), sensor 70 (for flap folding station 68), sensor 74 (for sealing station 72) and sensor 78 (for discharge device 76), to activate the respective folding, sealing or item loading stations. The sensors may be typical electronic eye sensors such as those made by Banner or Allen Bradley. Alternatively, the position of each bucket 42 on conveyor paths 12A and 12B may be known to PLC 100 by virtue of an encoder 29 (see FIG. 4b) interconnected with the servo motor 28, and configured in a manner that is known to persons skilled in the art.

As shown in detail in FIGS. 1, 2, 3a-b, 4a-b, 6 and 7, conveyor unit 12 may be formed with two side-by-side, generally parallel, chain and sprocket assemblies that include the following: a first chain 16 used in conjunction with sprockets 20 and 22, and a second chain 18 used in conjunction with sprockets 24 and 26. Referring to FIGS. 1, 3a-b, 4a-b, 6 and 7, motor 28 may be operable to drive the two chain and sprocket assemblies by driving the drive sprockets 20 and 24, which are coupled to the motor sprocket 27 of motor 28 by a first drive shaft 30 and a drive chain or belt (not shown). The rotation of the first drive shaft 30 caused by the motor 28 driving the motor sprocket 27 and the chain/belt (not shown) can cause the first chain 16 and second chain 18 of the conveyor 12 to move in unison in the directions indicated by arrows A, B, C and D in a rotational manner. This will in turn cause the idler sprockets 22 and 26, coupled together by a second shaft 32 to rotate in the same direction and at the same speed as sprockets 20 and 24. Motor 28 may be controlled by PLC 100, and motor 28 may be a servo motor such as a model Control Logix made by Allen Bradley. Conveyor 12 may be driven by motor 28 to achieve a continuous or an intermittent motion and at a constant or variable speed. Intermittent motion of conveyor 12 to index one or more buckets in a group of buckets 53 through each station may for example be accomplished by using a servo motor.

As shown in FIGS. 5 to 8, to provide for an interconnection between the conveyor 12 (and in particular chains 16 and 18) on the one hand, and the buckets 42 on the other, a plurality of mounting blocks/connector members 34 and associated conveyor mounting plates 36 may be provided. Buckets 42, connector members 34 and plates 36 may be configured to be removably attached to one another so that the buckets 42 and/or connector members 34 may be interchanged for different applications. Each bucket 42 may be secured to a top surface 34a of a connector member 34. Each connector member 34 may be similarly attached to an upper surface 36a of conveyor mounting plate 36. Attachment may be by any convenient method/device such as, for example, nuts and bolts. Plates 36 also have side plates 39a, 39b at opposed ends which may depend downward and with nut/bolt combinations 41a, 41b may be configured to be attached to chains 16 and 18.

Figure 6:
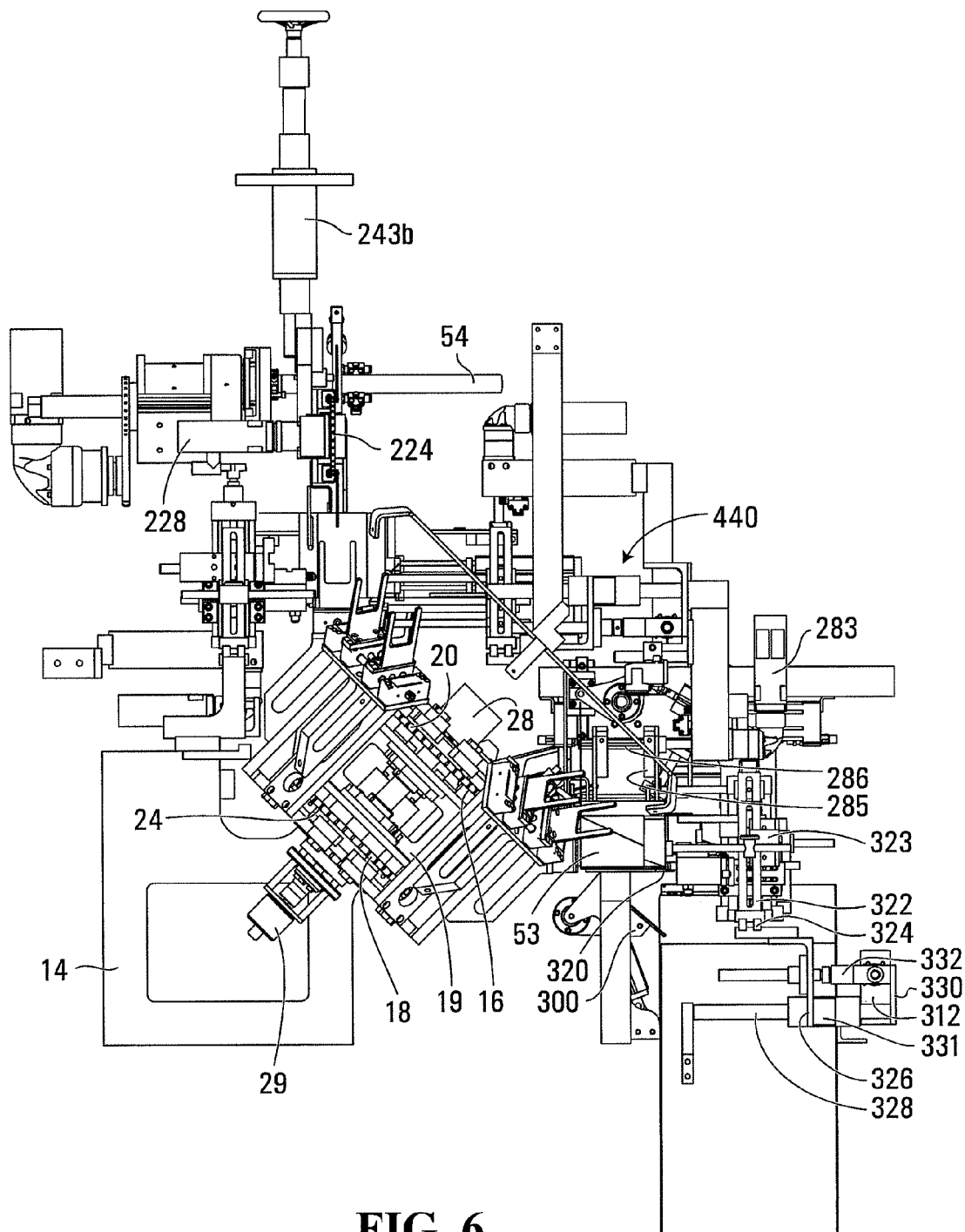
Figure 7:
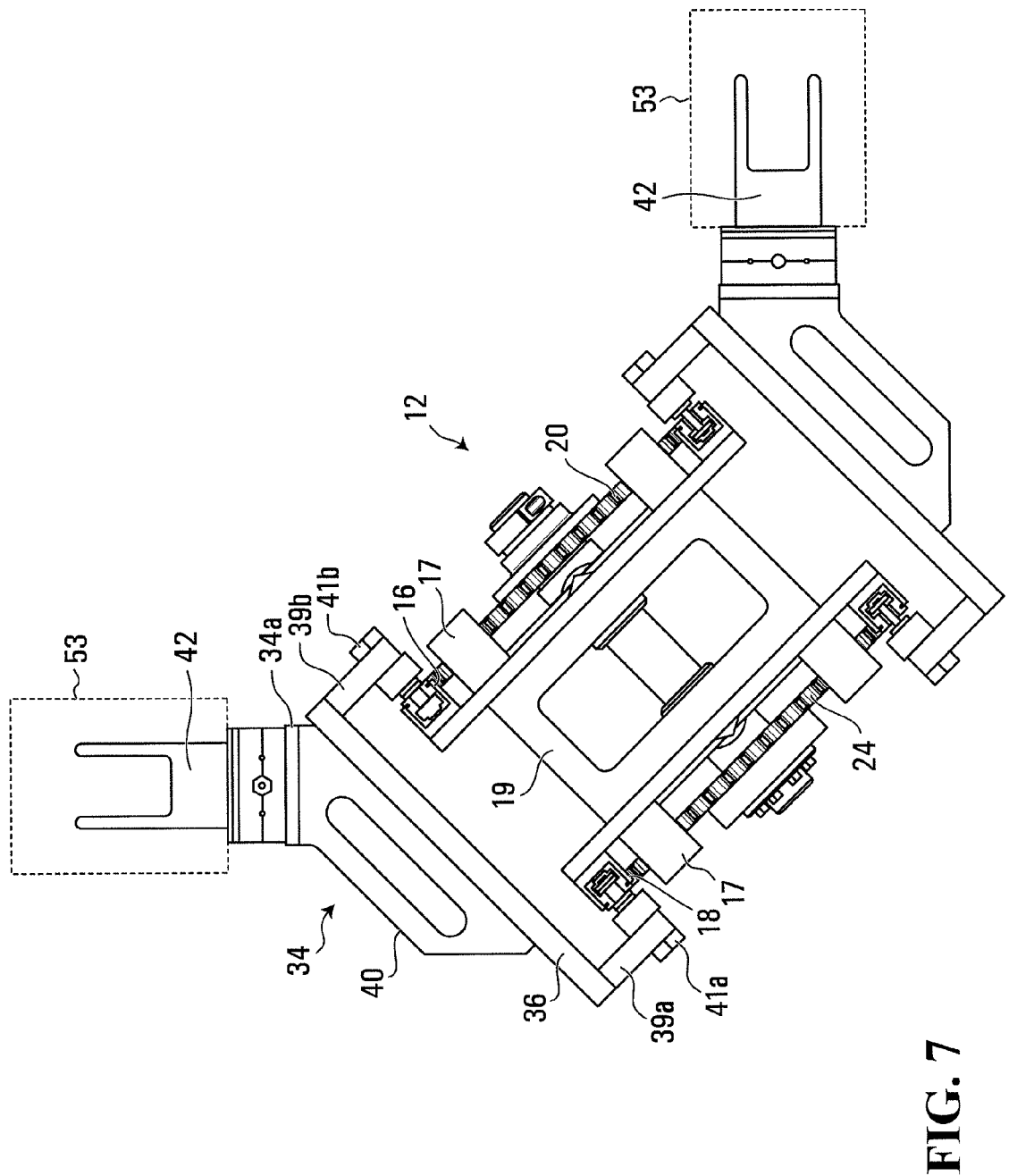
FIG. 7 is a view of the conveyor unit of FIG. 6 shown in isolation.
Figure 8:
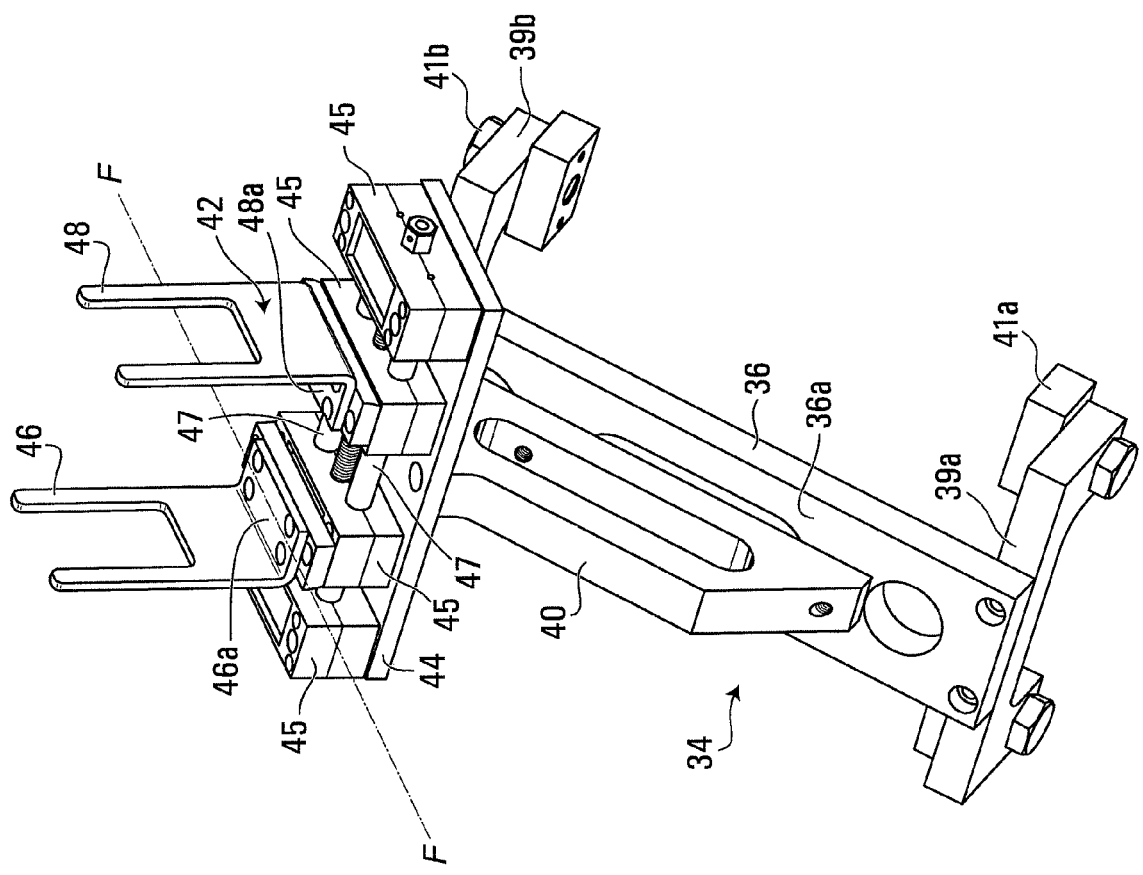
FIG. 8 is a perspective view of the bucket, connector member and conveyor mounting plate of the upper portion of FIG. 7 shown in isolation.

As shown in FIGS. 6-8, each bucket 42 may have a bottom plate 44 that is attached to connector member 34. Mounted on top of plate 44 may be a plurality of blocks 45 and rods 47 that provide for a size adjustment mechanism for upstanding generally L-shaped carton guide plates 46 and 48. Thus, different sized cartons 53 may be loaded using this apparatus. The bottom portion of each guide plate 46 and 48 has an upper surface 46a and 48a that together provide a supporting surface for a carton 53. A bucket 42, to receive and carry a horizontal carton 53, is attached to each connector member 34 by known means using standard fasteners.

With reference again to FIGS. 3a-4b and 6, an upper carton guide apparatus generally designated 210 may be provided. Upper carton guide apparatus 210 may include a support plate 223 inter-connected to a support frame (not shown). Mounted through support plate 223 may be extendible piston members 243a, 243b that can, with threaded adjustment rod 241, be used to lower and raise the guide components below that are suspended therefrom to accommodate different sized cartons 53. Mounted to piston members 243a, 243b is a horizontally oriented support bar member 245. Vertical support plates 251a, 251b are attached to support bar 245 and extend vertically downwards and provide support for an upper support rail 247 and a lower support rail 249. Lower support rail 249 and upper rail 247 are interconnected by web members 248a-d. Mounted at either end of and between upper and lower rails 247, 249 are opposed rotatable sprockets 222, 224 that carry a chain/belt 216. Sprocket 224 may be driven by a servo motor 228 that may be mounted to a support frame component. Motor 228 may be controlled by PLC 100 and be configured to drive chain 216 at the same speed as, and synchronized with, chains 16 and 18. Mounted to chain 216 may be guide lugs 253 that extend from chain 216. Lugs 253 may be positioned so that when chain 216 carries them on its lower run, a vertical surface of the lugs 253 will engage a side surface of each carton 53 and move with carton 53 as it moves along at least part of first path portion 12A, particularly while the minor side flaps and the bottom flap of each carton 53 are being folded and sealed with an appropriate adhesive. Thus, lugs 253 may help guide and stabilize the cartons 53 along the path portion 12A.

Figure 3B:
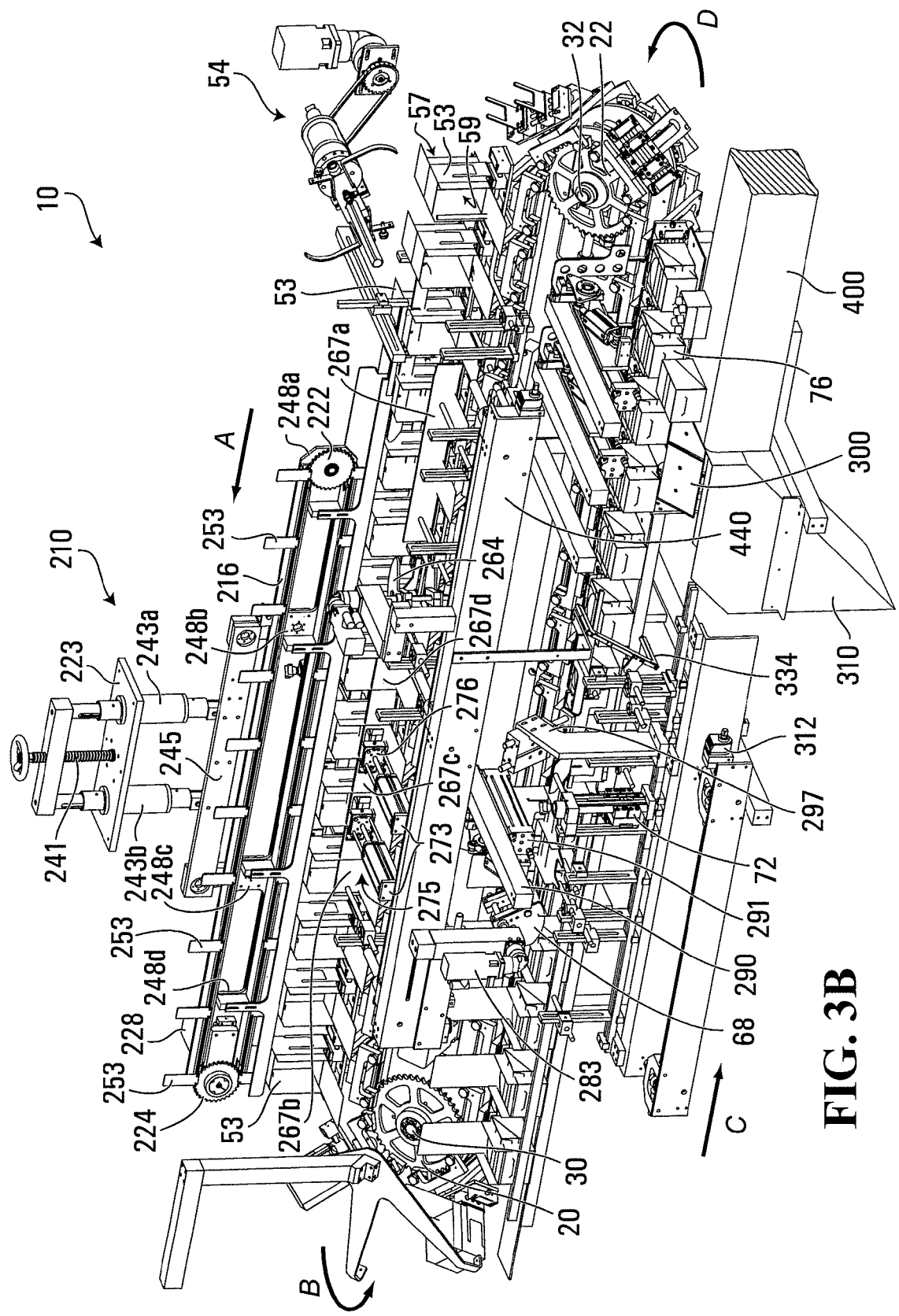

The front side 59 of each carton 53 may also be supported and guided by a series of longitudinally oriented guide plates 267a-267d (FIG. 3b).

The specific components of a combined folding and sealing station 56, 60 are also illustrated in detail in FIGS. 3a-4b.

With specific reference to FIG. 3a, a generally vertically oriented longitudinal rail 260 may be provided and may engage and fold inwards a leading minor flap on the bottom side 57 of each carton 53. A kicker device 262 may also be provided that may be activated and controlled by PLC 100. Kicker device 262 may comprise a servo motor 263 controlled by PLC 100 interconnected to a vertically upstanding shaft 261. Mounted generally horizontally to shaft 261 may be a pair of spaced paddle members 259. Rotation of shaft 261 by motor 263 may cause paddles 259 to rotate in such a manner to be able to fold inwards a trailing minor flap on the bottom side 57 of each carton 53 prior to the trailing minor flap's engagement with the longitudinal rail 260, as each carton moves along the first path portion 12A (FIG. 1). In this way, both the leading and trailing minor flaps of each carton 53 may be folded inwards and held in that position by rail 260.

With both of the minor bottom flaps folded inwards, as can be seen in FIG. 3b, each carton 53 may in turn move past another kicker device 264 constructed in a similar manner to kicker device 262. Kicker device 264 may be configured to fold outwards a leading minor flap on the top side 59 of each carton 53 to ensure that this flap will not block the top opening to carton 53. A vertically oriented longitudinal rail may also be provided to fold outwards the trailing minor flap on each carton 53, for the same reason.

Returning to FIG. 3a, the cartons 53 may after passing kicker device 264, continue on to upwardly angled guide bar 269 which may be configured to fold upward the bottom major flap on the bottom side 57 of each carton 53. A vertically oriented longitudinal rail 270 may subsequently engage and hold in that position the folded bottom major flap.

The cartons 53 may continue on to sealing apparatus 268 which may be configured and operable to (i) apply a suitable adhesive to an outer surface of the folded bottom major flap and (ii) fold over the upper major flap on the bottom side 57 of each carton 53. The result may thus be to entirely close the bottom opening of each carton 53.

Once the major panels are folded and adhesive has been applied therebetween, the cartons 53 may proceed to a compression apparatus generally designated as 275. Compression apparatus 275 may include a rear support plate device 271 that provides support for the rear, bottom side 57 of each carton 53 (see FIG. 3a). Compression apparatus may also include a pair of spaced pneumatic piston devices 273 which may for example be a model F100 made by Festo. Pistons 273 may each have a piston arm 274 with a compression plate 276 mounted to its end. Under control of PLC 100, piston arms 274 may each be extended through openings between guide plates 267b-267d, may then enter an open top of a carton 53 and may compress the bottom flaps of the carton 53 together by compressing the bottom flaps between compression plate 276 and the rear plate of support plate device 271. This action may ensure that the flaps are appropriately compressed and bonded together to form a flat sealed carton bottom.

Returning to the configuration of each of the buckets 42, as illustrated in FIG. 8, each bucket 42 has an axis F passing transversely there through and lying in the planar surfaces defined by the upper surfaces 46a and 48b. It is important to note that when travelling along the conveyor path defined by conveyor 12, the angular orientation of axis F and the associated plane or planes defined by upper surfaces 46a and 48a, along with the inner wall surfaces of each carton 53 supported in each bucket 42, will change.

Figure 5:
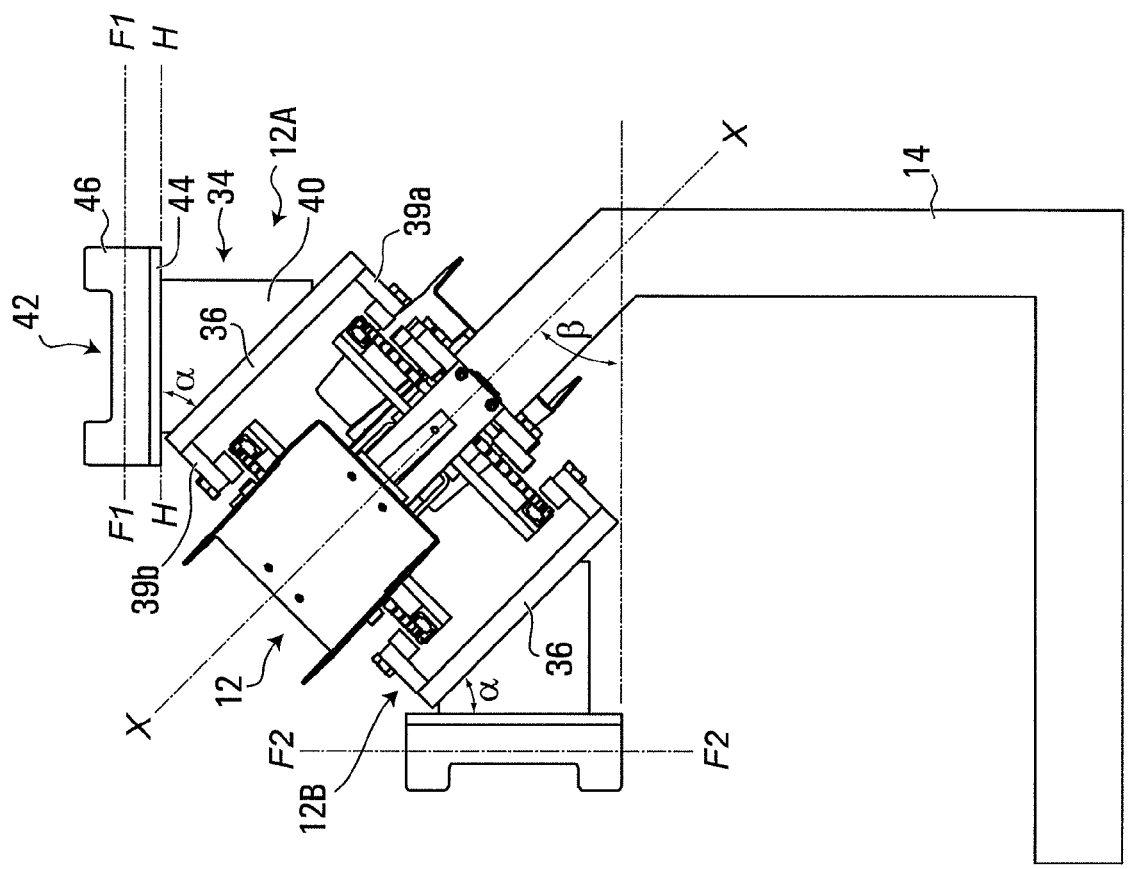

With reference with FIG. 5, conveyor 12 has central inclined axis X-X, and an axis of rotation passing through the center of each shaft 30 and 32 that are oriented so that they are both generally parallel to central inclined axis X-X. These axes are inclined at an acute conveyor angle β to the horizontal plane H. Furthermore, upward facing and downward facing surfaces associated with the chains 16, 18 of conveyor 12 corresponding to conveyor path portions 12A and 12B, respectively, are generally parallel to central inclined axis X-X and therefore are similarly inclined at an acute conveyor angle β to the horizontal plane H. Inclination conveyor angle β is preferably between about 30° to 60°, more preferably between about 40° and 50°, and most preferably at about 45°.

Buckets 42 attached to connector members 34 and chains 16, 18 may therefore be driven longitudinally along path portion 12A, rotate 180 degrees around the axis of rotation passing through the center of shaft 30, further be driven longitudinally along path portion 12B, and finally, rotate a further 180 degrees around the axis of rotation passing through the center of shaft 32 so as to return to the initial position.

With further reference to FIG. 5, when each bucket 42 is moving along first conveyor path portion 12A, transverse axis F1 may lie in the planar surface defined by upper surfaces 46a and 48a that is generally parallel to the horizontal plane H. The outer surface 55b of the carton 53 lying against surfaces 46a, 48a, and the corresponding inner surface 55a of the carton 53, may also be generally parallel to plane H. However it will be appreciated that each bucket 42 may be inclined at an acute wedge angle α a to the upward facing surface associated with conveyor 12. Wedge angle α may be between about 30° to 60°, between about 40° and 50°, and preferably at about 45°. Inclination angle α may also be approximately equal in magnitude to inclination angle β such that the axis F1 is also parallel to horizontal plane H. The appropriate selection and configuration of the connector members 34, conveyor angle β, and wedge angle α may be such that the orientation of the planar surface defined by upper surfaces 46a and 48a in which lies transverse axis F1 of bucket 42 is generally horizontal (i.e. parallel to plane H) along conveyor path portion 12A, although the path of the conveyor chains 16 and 18 along the upward facing surface associated with conveyor 12 is inclined, during movement of buckets 42 along conveyor path portion 12A, at conveyor angle β to the horizontal plane H. Thus, as shown in FIGS. 6 and 7, the openings to the carton 53 held in the bucket 42 may also be generally horizontal.

However, when each bucket 42 leaves first conveyor path portion 12A, then rotates around the axis of rotation passing through the center of shaft 30, and then starts to move along second conveyor path portion 12B, the transverse axis F2 that lies in the planar surface defined by upper surfaces 46a and 48a is now generally perpendicular to the horizontal plane H. Thus, as shown in FIGS. 3a-b, 6, and 7, the openings to the cartons 53 held in the buckets 42 may then also be oriented generally vertically upwards. However, each bucket 42 is still inclined at an acute wedge angle α to the corresponding downward facing surface associated with conveyor 12, and the path of the conveyor chains 16 and 18 along the downward facing surface associated with conveyor 12 is inclined during movement along conveyor path portion 12B at conveyor angle β to the horizontal plane H.

It will be appreciated that in effect, the transverse axis F of each bucket 42 and the planar surface defined by upper surfaces 46a and 48a may be rotated about the axis of rotation that is parallel to axis X-X and which passes through the center of first shaft 30. The result is that there is a net effect of axis F being rotated from F1 to F2 by an angular amount equal to two times the value of the angle α. If that angle is chosen to be 45 degrees, the net effect is to rotate the orientation of buckets 42 from when they are travelling from conveyor path portion 12A to conveyor path portion 12B by 90 degrees (i.e. from horizontal to vertical). This provides that along path portion 12B, the cartons 53 held in buckets 42 have openings that are oriented generally upwards to allow for vertical loading of items.

It will be appreciated also that once each bucket 42 has finished moving along path portion 12B of the conveyor 12, at the opposite end of conveyor 12, the transverse axis F of each bucket 42 and the planar surface defined by upper surfaces 46a and 48a will be rotated again, but this time about the axis of rotation that passes through the center of second shaft 32. The result is that there is a net effect of axis F being rotated from F2 to F1 by an angular amount again equal to two times the value of the angle α, but in the opposite direction. The effect is to return each of the buckets 42, in turn, to the generally horizontal orientation that they establish and maintain along path portion 12A.

To achieve the aforementioned effects, it may be provided that each connector member 34 is appropriately configured. As is illustrated in FIGS. 5-8, each connector member 34 may have an upstanding connector member plate 40 which is mounted to an associated conveyor plate 36. The connector member plate 40 may be generally triangular or wedge shaped (in FIG. 5, the connector being in the shape of a right triangle) having an acute wedge angle α at the apex that will lie between the base of the bucket 42 and the top surface of the conveyor mounting plate 36. As mentioned above, assuming that the conveyor 12 will have a first path portion 12A that is generally horizontal, it is desirable that the angle α be selected between about 30 degrees to 60 degrees, more preferably between about 40 degrees and 50 degrees, and most preferably at about 45 degrees.

Although it is described in this embodiment that the orientation of the planar surface defined by upper surfaces 46a and 48a is generally horizontal along conveyor path portion 12A, it is contemplated that the orientation may be varied, and that corresponding different connector members 34 with different wedge angle α could be employed. Alternatively, jack screws, eccentric cams, and linkages may be used to adjust the orientation of the connector 34 and bucket 42 relative to each other so as to alter the wedge angle α.

It will also be appreciated that in this embodiment the central inclined axis X-X and the axes of rotation passing through the center of each shaft 30 and 32 parallel thereto, may all be inclined at an acute conveyor angle β approximately 45 degrees to the horizontal, and that this angle may be fixed. However, the support frame 14 and/or the mechanism for mounting conveyor 12 to support frame 14 may be configured to be adjustable to enable other conveyor angles of inclination to be employed on the same cartoner 10.

Returning again to FIGS. 3a-4b and FIG. 6, it will be appreciated that after buckets 42 have rotated around the shaft 30 of sprockets 20 and 24, the buckets 42 may pass to a loading station 64 where one or more items 55 may be loaded into each carton 53 by a loading apparatus (not shown in FIGS. 3a-4b). Once an item 55 has been loaded into each of one or more cartons 53 (e.g. two cartons) the conveyor 12 may move buckets 42 with the loaded cartons 53 further along the second path portion 12B towards a combined flap and sealing station designated generally in FIGS. 3a-4b as 268. Station 268 may include a kicker device 280. Kicker device 280 may comprise a servo motor 283 controlled by PLC 100 and may be interconnected to a horizontally oriented shaft 286 (FIG. 6). Mounted generally vertically to the shaft 286 may be a pair of spaced paddle members 285. Rotation of the shaft 286 by motor 283 can cause paddles 285 to rotate in such a manner to be able to fold inwards a trailing minor flap on the top side 59 of each carton 53. A generally horizontally oriented longitudinal rail is also provided and may engage and fold inwards a leading minor flap on the top side 59 of each carton 53.

Station 268 may also include devices as shown, controlled by PLC 100, that are capable of folding over and sealing the single major top flap of each carton 53. For example, a beam device 290 may be provided that has a movable piston device 291 attached thereto. The arm of piston device 291 may have a plate 293. Extension of the arm of the piston 291 may cause the major top flap of the carton 53 to be brought down to a horizontal orientation, with a portion extending over the top edge of the carton 53. Each carton 53 may then be moved to sealing and folding device 297 which can apply a suitable adhesive to an undersurface of the overlapping portion of the top major flap (or the corresponding area on the carton 53), and then fold that portion against a side wall of the carton 53 to seal the carton 53.

Figure 4A:
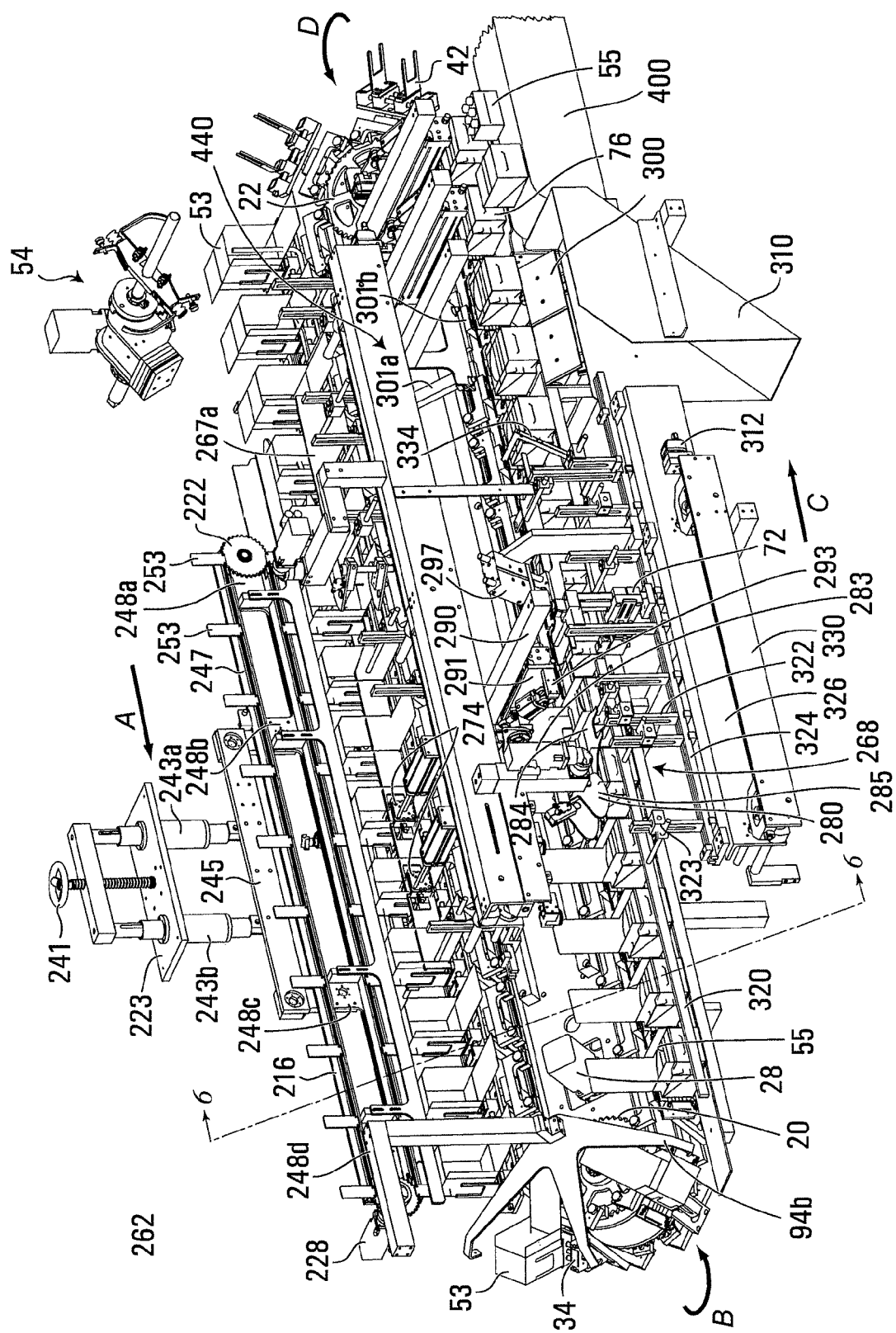
Figure 4B:
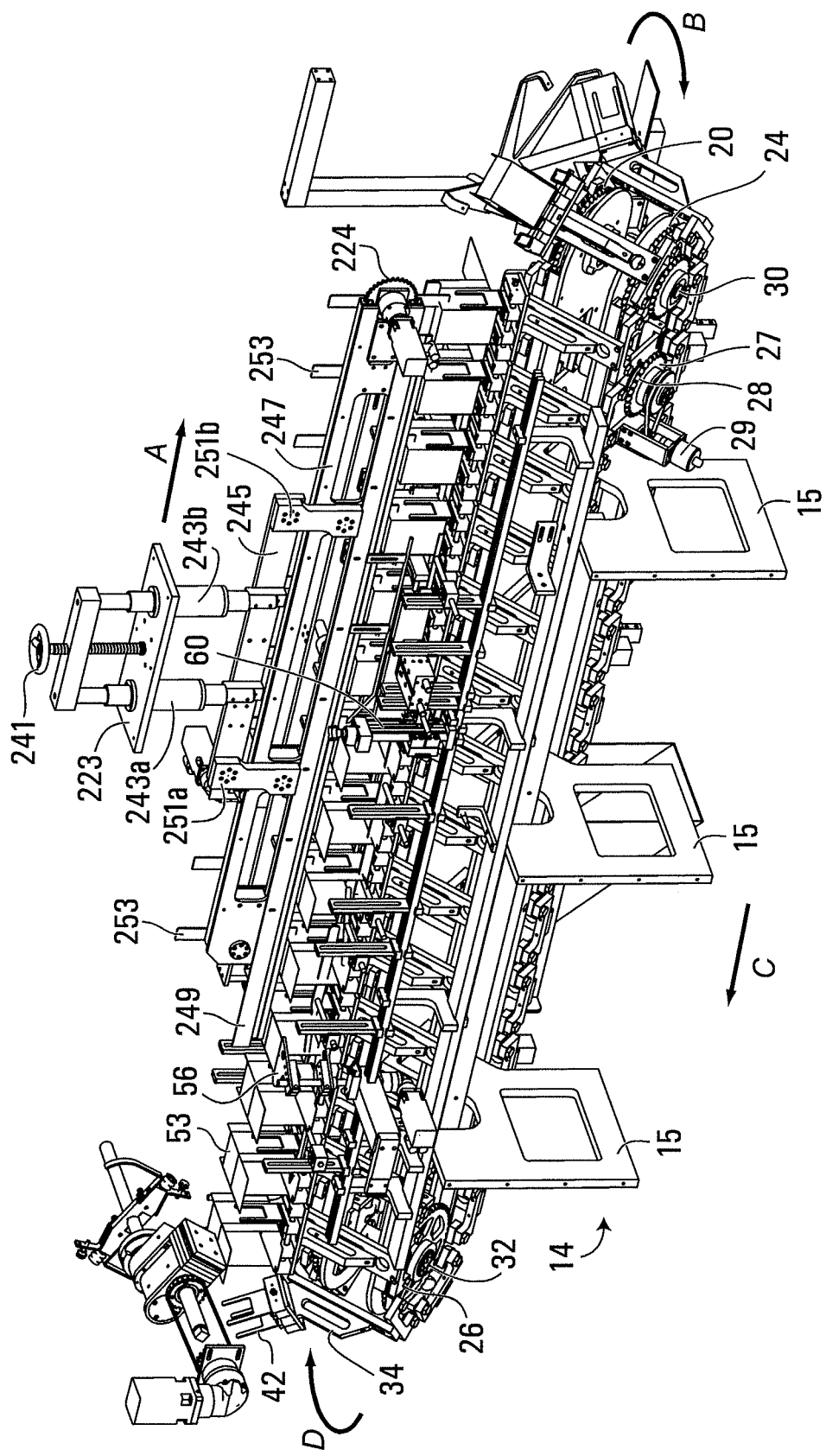

With particular reference to FIGS. 4*a* and 6, the front side of the cartons 53 may be guided and supported in their buckets 42 by longitudinally extending compression rail members 320. Rail members may be supported by upstanding vertical slotted plates 322 interconnected with adjustable block and rods 323 that extend horizontally. Plates 322 are supported on longitudinally extending twin rails 324 that in turn are bolted through support blocks to L-shaped plate member 326. The twin rails 324 may also support the upper flap folding rails.

L-shaped plate member 326 may be interconnected with two linear ball bushing housings 331 that each include a threaded rod 328 supported by U-shaped brackets 332 which in turn are connected to part of a support frame 330. Thus, the lateral position of the twin rails 324 and the compression 320 and flap folding rails supported thereon, can be adjusted to accommodate different sized cartons 53.

It should be noted that a similar corresponding guide rail apparatus operable for adjustment and support of the compression and flap folding rails associated with the upper path portion of the buckets 42 and cartons 53 carried thereon, may also be provided. In FIGS. 3*b*, 4*a*, and 6, this arrangement is generally designated as 440.

Further guide rails (shown in dotted outline in FIGS. 3*b*, 4*a*) supported by adjustable support bracket 94*b* may be utilized to help retain carton 53 in the bucket 42 while the carton 53 and bucket 42 rotate around sprockets 20 and 24 in direction B.

Returning to conveyor path portion 12B, an electronic eye sensor 334 can also be provided to ensure each carton 53 leaving folding/sealing station 268 is properly folded and sealed. An example of such a sensor 334 that can be employed is the model AB39654 made by Allen Bradley.

If the sensor 334 detects a problem with a carton 53 or both cartons 53 in a group of two cartons, a trap door mechanism can be activated by PLC 100 upon receipt of a signal from the sensor 334. A trap door 300 may be opened and PLC 100 may also cause one or both of piston devices 301*a*, 301*b* (see FIG. 4*a*) to be activated to push, lift and/or pull the reject cartons 53 from the buckets 42 carrying them through the opening into a chute 310. A sensor 312 can be positioned to detect and count the rejected cartons as they pass down chute 310.

If a carton 53 is not rejected it is moved on its bucket 42 to discharge station 76. At this discharge station 76, an apparatus may be provided, controlled by PLC 100, to move the cartons 53 out of their buckets 42 on the conveyor 12 onto a transport conveyor 400 that may transport the loaded cartons 53 away. Such an apparatus may include discharge conveyor.

With reference now back to FIG. 1, in operation a plurality of carton blanks 52 may be loaded into a suitable magazine 50 for dispensing. A suitable carton feeder, such as a rotary object feeder 54, may remove carton blanks 52 in series from magazine 50, erect the carton blanks 52 into a horizontal carton 53 having a tubular form with a first 57 and a second 59 open end with end flaps at each of the first 57 and second 59 open end, and place and release each of the horizontally oriented cartons 53 onto a bucket 42 on conveyor 12. The buckets 42 may then travel along conveyor path portion 12A in series in the direction indicated by arrow A with the horizontal carton 53 lying on the upper surfaces 46*a* and 48*a*.

Turning to FIG. 2, while the reference to bucket 42 is directed generally to a bucket carrying a horizontal carton 53 that is undergoing the fill and discharge cycle on the cartoner 10, specific references will be made to buckets 42Q, 42R, 42S, 42T, 42U and 42V to illustrate a bucket at the various stations synchronized along conveyor 12 of the cartoner 10 during a typical loading and discharge cycle on cartoner 10.

A horizontal carton 53 with a first 57 and a second 59 open end, once erected into tubular form and released by carton feeder 54, may be carried by a bucket 42 along conveyor path portion 12A until it reaches the proximity of flap folding station 56, as indicated by bucket 42Q. Sensor 58 may sense the arrival of bucket 42Q, and may send a signal to the PLC 100 to activate the flap folding station 56 to fold the end flaps of horizontal carton 53 at the first open end 57. Note that instead of a sensor, this folding may be effected "on the fly" as the carton may pass by one or more appropriately positioned rails that cause end flaps to be folded over. Horizontal carton 53 may, while being folded, also be sealed with, for example, a suitable adhesive. Alternatively, each bucket 42 may continue along conveyor path portion 12A until it reaches the proximity of sealing station 60, as indicated by bucket 42R. Sensor 62 may sense the arrival of bucket 42R, and send a signal to the PLC 100 to activate the sealing station 60 to seal the end flaps at the first end 57 of the horizontal carton 53. The folding and sealing of the bottom flaps of each carton 53 may be accomplished by the apparatuses depicted in FIGS. 3*a*-4*b* as described above.

Once the first end flaps of the horizontal carton 53 are sealed, the horizontal carton 53 may continue to travel along conveyor path portion 12A in bucket 42. As the chains 16, 18 of conveyor 12 loop around the first sprocket 20 and third sprocket 24, which are coupled together by first shaft 30, connector member 34 and the bucket 42 mounted thereon undergo a change in orientation. As best illustrated in FIGS. 5, 7, and 8, bucket 42 and the horizontal carton 53 carried thereon change from a generally horizontal position, where upper surfaces 46*a* and 48*a* of bucket 42 defining first plane 90, and the horizontal carton 53 lying above upper surfaces 46*a* and 48*a*, are oriented in a generally horizontal plane; to a generally vertical orientation, where upper surfaces 46*a* and 48*a* of bucket 42 defining first plane 90, and the horizontal carton 53 adjacent to upper surfaces 46*a* and 48*a*, are oriented in a generally vertical orientation as conveyor 12 changes from travelling along the direction indicated by arrow A, to rotating in a manner illustrated by arrow B, to travelling in the direction indicated by arrow C. As the buckets 42 on conveyor 12 continue to travel along conveyor path portion 12B in the direction indicated by arrow C, the carton 53 carried in each bucket 42 may be now vertically oriented, with its second open end 59 facing upwards. In this orientation, the carton 53 may be loaded with product in a vertical manner, i.e. a product may be inserted into the carton vertically.

Returning to FIG. 2, re-oriented carton 53 carried by bucket 42 may continue to travel along conveyor path portion 12B in the direction indicated by arrow C, until it reaches item loading station 64 as indicated by bucket 42S. Sensor 66 may sense the arrival of the carton 53 in bucket 42S, and send a signal to the PLC 100 to activate loading station 64 to vertically fill the carton 53, now oriented vertically with its second open end 59 facing upwards, with one or more items. As mentioned, the conveyor 12 may be driven in an intermittent manner, such that the buckets 42 are indexed along conveyor path portions 12A and 12B and may remain stationary at different locations along conveyor path portions 12A and 12B, including during loading of one or more items into the carton 53 with a conventional product loading device such as a cartesian or robotic inserter. It should be noted that the conveyor 12 may also be driven continuously. For example, a conventional product loading device can load items into the carton 53 while the bucket 42 and carton 53 are continuously moving on conveyor path portion 12B.

Once the re-oriented carton 53 is filled with a product, conveyor 12 may move bucket 42 with carton 53 until the carton reaches a flap folding station 68, as indicated by bucket 42T. Sensor 70 may sense the arrival of bucket 42T with the carton 53, and send a signal to the PLC 100 to active the post-fill flap folding station 68 to fold the top flaps on the second open end 59 of the carton 53. Once the flaps of the second end 59 of the carton 53 are folded, the carton 53 continues to travel along conveyor 12 until it reaches sealing station 72 as indicated by bucket 42U. Sensor 74 may sense the arrival of bucket 42U carrying the carton 53, and sends a signal to the PLC 100 to activate sealing station 72 to seal the end flaps at the second end 59 of carton 53. Alternatively, the folding of the end flaps may, with appropriately positioned guide rails, be conducted "on the fly" as the bucket 42 and carton 53 move through a folding station 68. It is appreciated that the post-fill flap folding station 68 and the post fill sealing station 72 may manipulate the carton 53 in a vertical direction to fold and seal the flaps, respectively, at the second end 59 of the carton 53. This may be configured in a similar manner to flap folding station 56 and sealing station 60. The folding and sealing of the top flaps of each carton 53 may be accomplished by the apparatuses depicted in FIGS. 3a-4b as described above.

Carton 53 continues along in its bucket 42 interconnected with conveyor 12 until it reaches discharge device 76 as indicated by bucket 42V. Sensor 78 senses the arrival of bucket 42V carrying the carton 53, and sends a signal to the PLC 100 to activate discharge device 76 to remove the carton 53 from conveyor 12. The discharge device 76 may place the carton 53 onto a separate conveyor for further processing, or may place the sealed and loaded carton on a pallet.

In an alternative embodiment incorporating a second optional item loading station 61 along conveyor path portion 12A, it will be appreciated that this configuration may be advantageous as the cartoner 10 may better accommodate products comprising a plurality of items, one or more of which may be preferably loaded in a horizontal orientation, and one or more items which may be preferably loaded in a vertical orientation. By way of example only, pasta and cheese products delivered to consumers in a carton may include a packet of cheese and a bag of loose pasta. The cheese packet may be better suited to being loaded into the carton 53 in a horizontal orientation. However, the bag of loose pasta may be better suited for being loaded into carton 53 in a vertical orientation. Cartoner 10 can be modified to accomplish such a dual loading capability.

With reference to FIG. 1, in operation a plurality of carton blanks 52 are loaded into a suitable magazine 50 for dispensing. A suitable carton feeder, such as a rotary object feeder 54, may remove a carton blank 52 from magazine 50, erect the carton blank 52 into a horizontal carton 53 having a tubular form with a first 57 and a second 59 open end with end flaps at each of the first 57 and second 59 open end, and release the horizontally oriented carton 53 onto a bucket 42 on conveyor 12 travelling along conveyor path portion 12A in the direction indicated by arrow A. The horizontal carton 53 lies on the upper surfaces 46a and 48a.

Turning to FIG. 2, while the reference to bucket 42 is directed generally to a bucket carrying a horizontal carton 53 that is undergoing the fill and discharge cycle on the cartoner 10, specific references will be made to buckets 42Q, 42R, 42S, 42T, 42U, 42V, and 42W to illustrate a bucket at the various stations synchronized along conveyor 12 of the cartoner 10 during a typical loading and discharge cycle on cartoner 10.

A horizontal carton 53 with a first 57 and a second 59 open end, once erected into tubular form and released by carton feeder 54, is carried by a bucket 42 along conveyor path portion 12A until it reaches the proximity of pre-fill flap folding station 56, as indicated by bucket 42Q. Sensor 58 may sense the arrival of bucket 42Q, and may send a signal to the PLC 100 to activate the flap folding station 56 to fold the end flaps of horizontal carton 53 at the first open end 57. Note that instead of a sensor, this folding may be effected "on the fly" as the carton may pass by one or more appropriately positioned rails that cause end flaps to be folded over. Horizontal carton 53 may, while being folded, also be sealed with, for example, a suitable adhesive. Alternatively, each bucket 42 may continue along conveyor path portion 12A until it reaches the proximity of sealing station 60, as indicated by bucket 42R. Sensor 62 may sense the arrival of bucket 42R, and send a signal to the PLC 100 to activate the sealing station 60 to seal the end flaps at the first end 57 of the horizontal carton 53. Once the first end flaps of the horizontal carton 53 are sealed, the horizontal carton continues to travel along conveyor path portion 12A in bucket 42 until it reaches item loading station 61 as indicated by bucket 42W. Sensor 63 may sense the arrival of the carton 53 in bucket 42W, and send a signal to the PLC 100 to activate item loading station 61 to horizontally partially fill the horizontal carton 53. Horizontal loading station 61 may be any suitable horizontal loading device such as, for example, a model CHS 3 made by Spee-dee that could load a packet of cheese horizontally into a carton 53. Once the horizontal carton 53 is partially filled, the horizontal carton 53 can continue to travel along conveyor path portion 12A in bucket 42.

As the conveyor 12 loops around the first sprocket 20 and third sprocket 24, which are coupled together by first shaft 30, connector member 34 and the bucket 42 mounted thereon undergo a change in orientation. As best illustrated in FIGS. 5, 7, and 8, bucket 42 and the horizontal carton 53 carried thereon change from a generally horizontal position, where upper surfaces 46a and 48a of bucket 42 defining first plane 90, and the horizontal carton 53 lying above upper surfaces 46a and 48a, are oriented in a generally horizontal plane; to a generally vertical orientation, where upper surfaces 46a and 48a of bucket 42 defining first plane 90, and the carton 53 adjacent to upper surfaces 46a and 48a, are oriented in a generally vertical orientation as conveyor 12 changes from travelling along the direction indicated by arrow A, to rotating in a manner illustrated by arrow B, to travelling in the direction indicated by arrow C. As conveyor 12 continues to travel along conveyor path portion 12B in the direction indicated by arrow C, the re-oriented carton 53 carried in each bucket 42 may now be vertically oriented, with its second open end 59 facing upwards. In this orientation, the carton 53 may be loaded with product in a vertical manner, i.e. a product may be inserted into the carton vertically (e.g. pasta to complement the packet of cheese).

Returning to FIG. 2, re-oriented carton 53 carried by bucket 42 may continue to travel along conveyor path portion 12B in the direction indicated by arrow C, until it reaches item loading station 64 as indicated by bucket 42S. Item loading station 64 may include for example a model CHS 3 loading device made by Spee-dee that would be capable of loading a bag of loose pasta into the already partially filled carton 53. Sensor 66 may sense the arrival of the carton 53 in bucket 42S, and send a signal to the PLC 100 to activate loading station 64 to vertically fill the carton 53, now oriented vertically with its second open end 59 facing upwards, with, for example, the bag of loose pasta. As mentioned, the conveyor 12 may be driven in an intermittent manner, such that the bucket 42 may remain stationary during loading of one or more items into the carton 53 with a conventional product loading device such as a cartesian or robotic inserter. It should be noted that the conveyor 12 may also be driven continuously, whereby a conventional product loading device can load items into the carton 53 while the bucket 42 and carton 53 are continuously moving on conveyor path portion 12B.

Once the re-oriented carton 53 may be filled with the pasta product, conveyor 12 can move the carton 53 until the carton 53 reaches a flap folding station 68, as indicated by bucket 42T. Sensor 70 senses the arrival of bucket 42T with the carton 53, and sends a signal to the PLC 100 to active the post-fill flap folding station 68 to fold the flaps on the second open end 59 of the carton 53. Once the flaps of the second end 59 of the carton 53 are folded, the carton 53 continues to travel along conveyor 12 until it reaches sealing station 72 as indicated by bucket 42U. Sensor 74 may sense the arrival of bucket 42U carrying the carton 53, and sends a signal to the PLC 100 to activate sealing station 72 to seal the end flaps at the second end 59 of carton 53. It is appreciated that the post-fill flap folding station 68 and the post-fill sealing station 72 may manipulate the carton 53 in a vertical direction to fold and seal the flaps, respectively, at the second end 59 of the carton 53. This may be configured in a similar manner to flap folding station 56 and sealing station 60.

Re-oriented carton 53 continues along in its bucket 42 interconnected with conveyor 12 until it reaches discharge device 76 as indicated by bucket 42V. Sensor 78 senses the arrival of bucket 42V carrying the carton 53, and sends a signal to the PLC 100 to activate discharge device 76 to remove the carton 53 from conveyor 12. The discharge device 76 may place the carton 53 onto a separate conveyor for further processing, or may place the sealed and loaded carton on a pallet.

Conveyor 12 may be driven in an intermittent motion such that upon a bucket 42 reaching one of the aforementioned stations, conveyor 12 will come to a gradual stop for a predetermined amount of time to enable the operation at the aforementioned stations to be completed before conveyor 12 resumes travelling The predetermined amount of time may be programmed in the PLC 100. It should be noted that cartoner 10 may be configured such that a group of two or more buckets 42 in the group, and one or more cartons 53 carried thereon, may be processed at each of the various stations.

Alternatively, conveyor 12 may be synchronized to run at a continuous speed which enables the operations at the various folding, sealing, filling and discharge stations to be accomplished while bucket 42 travelling along conveyor 12 is in the vicinity of the respective stations. In order to maximize efficiency, it is most preferable that buckets 42 be arranged in intervals along conveyor 12 in such a manner that at any given time when one bucket 42 arrives at one station, the remaining stations each have one bucket 42 present in its vicinity such that the operations at each station may be accomplished on different cartons 53, carried by different buckets 42, at the same time. By way of example, as illustrated in FIG. 2, while a first bucket 42Q arrives at folding station 56, a second bucket 42R arrives at sealing station 60, a third bucket 42W arrives at the item loading station 61, a fourth bucket 42S arrives at the item loading station 64, a fifth bucket 42T arrives at flap folding station 68, a sixth bucket 42U arrives at sealing station 72, and a seventh bucket 42V arrives at the discharge device 76. It is understood that the respective cartons 53 in each of the aforementioned buckets 42 are all at different stages of the loading process: the carton 53 in bucket 42Q will have the end flaps at the first end 57 folded at the folding station 56 with the second end 59 remaining open with end flaps; the carton 53 in bucket 42R will have the second end 59 open and the first end 57 closed and sealed at the sealing station 60; the carton 53 in bucket 42W will have one end 57 sealed and one end 59 open to be horizontally filled with product at optional item loading station 61; the carton 53 in bucket 42S will have one end 57 sealed and one end 59 open to be vertically filled with product at optional item loading station 64; the carton 53 in bucket 42T will have the second end 59 folded at the flap folding station 56; the carton 53 in bucket 42U will have the second end 59 sealed at the sealing station 72; and the carton 53 in bucket 42V will be completely sealed at its first end 57 and second end 59 and discharged from conveyor 12 by discharge device 76.

The present invention has many advantages, including allowing products such as light bulbs and bottles, which typically are packaged into vertical cartons because these products need to be loaded vertically, to continue to be loaded vertically, but in a typical horizontal carton that has been reoriented such that its end flaps are open in the vertical direction to enable vertical loading. Unlike vertical cartons which may not erect properly if misaligned on the die, horizontal cartons are considerably easier to feed and erect into tubular blanks. As such, the use of horizontal cartons to enable the vertical loading of product greatly improves throughput and cost efficiency, both in terms of cycle time and material usage. Further, the present invention has a small footprint, which is a great advantage in a manufacturing environment where floor space is of utmost importance.

Although the present invention has been described in detail with reference to the embodiments disclosed, other embodiments are possible. For example, cartoner 10 may utilize only one chain and sprocket assembly, or may utilize any other type of conveyor 12 that could carry a bucket 42. The packaging equipment illustrated to be used with cartoner 10 may vary, and additional packaging equipment may be utilized with cartoner 10. Furthermore, it is contemplated that in another embodiment, conveyor 12 may be a typical horizontal conveyor (i.e. conveyor angle β is 0 degrees), but wherein buckets 42 are configured to be in a generally horizontal position while travelling along conveyor path portion 12A and in a generally vertical position while travelling along conveyor path portion 12B. For example, this change in orientation may be enabled by employing a hinge proximate to one end of connector member 34 to connect connector member 34 to bucket 42. While travelling along conveyor path portion 12A, the hinge is closed so that bucket 42 is generally horizontal (i.e. wedge angle α is 0 degrees). After bucket 42 rotates around the first axis of rotation, gravity, together with optional guide rails, may cause bucket 42 to swing open so as to be configured in a generally vertical position. Bucket 42 may then travel along conveyor path portion 12B in a generally vertical position. After bucket 42 rotates around the second axis of rotation, gravity, together with optional guide rails, may cause bucket 42 to swing closed so as to return to a generally horizontal position.

It should be noted that embodiments may be employed in applications where the orientation of the containers during a first path is not generally horizontal, but may be at an angle to the horizontal.

Although not specifically described in detail herein, suitable modifications may be made to the embodiments described by persons skilled in the art depending on the type of wash facility, and otherwise, being used for a particular application. Of course, the foregoing embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

The invention claimed is:

1. A system for loading at least one item into each of a plurality of containers, said system comprising:
   (i) a bucket configured for supporting at least one container, said container having a plurality of side walls interconnected in a tubular configuration with first and second end openings and a plurality of flaps extending from said side walls;
   (ii) a conveyor being interconnected to said bucket, said conveyor being operable to move said bucket along a first path portion and a second path portion;
   (iii) a folding station proximate said first path portion for folding a flap to close said first end opening as said bucket is moved along said first path portion;
   said conveyor having a conveyor axis of rotation, said axis of rotation of said conveyor being oriented at an acute conveyor angle to a horizontal plane;
   said bucket being oriented relative to said conveyor axis of rotation by a wedge angle;
   said conveyor being configured and operable to rotate said bucket around said axis of rotation from said first path portion to said second path portion;
   wherein a side wall of said container is oriented generally in or parallel to said horizontal plane when said bucket is moved along said first path portion and wherein said second end opening faces upwardly to receive an item when said bucket is moved along said second path portion.

2. A system as claimed in claim 1 wherein said bucket has an inward facing bottom surface and a pair of opposed inward facing side surfaces for supporting said container.

3. A system as claimed in claim 2, wherein said system comprises a plurality of buckets, and further comprising a magazine for holding a plurality of container blanks and a feeder positioned proximate said magazine and said first path portion, said feeder being adapted to retrieve a plurality of container blanks in series from said magazine, erect each said container blank into a container and place said container into a bucket on said first path portion of said conveyor.

4. A system as claimed in claim 3 further comprising a vertical loading apparatus positioned proximate said second path portion, said vertical loading apparatus operable to load at least one item into each said container when each said container is on said second path portion.

5. A system as claimed in claim 4 further comprising a horizontal loading apparatus positioned proximate said first path portion, said horizontal loading apparatus operable to load at least one item into each said container when each said container is moving on said first path portion.

6. A system as claimed in claim 4 further comprising a PLC operable to control the movement of said conveyor and said vertical loading apparatus.

7. A system as claimed in claim 1 wherein said wedge angle is substantially equal to said conveyor angle.

8. A system as claimed in claim 7 wherein said wedge angle is between 30 and 60 degrees.

9. A system as claimed in claim 7 wherein said wedge angle is approximately 45 degrees.

10. A system as claimed in claim 7 wherein said wedge angle is 45 degrees.

11. A system as claimed in claim 1 wherein said conveyor is interconnected to said bucket with a connector member positioned between said conveyor and said bucket.

12. A system as claimed in claim 11 wherein each said connector member is generally wedge shaped to provide said wedge angle between said bucket and said conveyor that is substantially equal to said conveyor angle.

13. A system as claimed in claim 1 wherein said conveyor is a continuous conveyor having a cyclical path moving said bucket along said first path portion to said second path portion and then along said second path portion back to said first path portion.

14. A system as claimed in claim 13 wherein said axis of rotation is a first axis of rotation and wherein said conveyor has a second axis of rotation, said second axis of rotation of said conveyor also being oriented at said acute conveyor angle to said horizontal plane; said conveyor being configured and operable to move said bucket in series around said second axis of rotation from said second path portion to said first path portion.

15. A system as claimed in claim 1 wherein said conveyor is configured and operable to rotate said bucket 180 degrees around said first axis of rotation from said first path portion to said second path portion and thereafter rotate said bucket 180 degrees around said second axis of rotation from said second path portion back to said second path portion.

16. A system as claimed in claim 1 wherein said conveyor comprises first and second sprocket and chain assemblies, each of said first and second assemblies comprising a chain mounted around a pair of spaced sprockets, at least one of said sprockets in each said assembly being driven by a motor drive.

17. A system as claimed in claim 1 further comprising a support device for supporting each said container in each said bucket when each said bucket is moving along said second path portion.

18. A system as claimed in claim 1 further comprising a drive motor operable to cause the movement of said conveyor.

19. A system as claimed in claim 18 wherein said drive motor is operable to drive said conveyor with intermittent movement.

20. A system as claimed in claim 18 further comprising a PLC operable to control the movement of said conveyor.

21. A system for loading at least one item into each of a plurality of containers, said system comprising:
   (i) a plurality of buckets, each of said plurality of buckets configured for supporting at least one container, said container having at least one side wall with an inner surface and at least one end opening;

(ii) a conveyor being interconnected to each of said plurality of buckets, said conveyor being operable to move said plurality of buckets in series along a first path portion and a second path portion;

(iii) a magazine for holding a plurality of container blanks and a feeder positioned proximate said magazine and said first path portion, said feeder being adapted to retrieve a plurality of container blanks in series from said magazine, erect each said container blank into a container and place said container into a bucket on said first path portion of said conveyor;

said conveyor having a conveyor axis of rotation, said axis of rotation of said conveyor being oriented at an acute conveyor angle to a horizontal plane;

said buckets being oriented relative to said conveyor axis of rotation by a wedge angle;

said conveyor being configured and operable to rotate each of said plurality of buckets in series around said axis of rotation from said first path portion to said second path portion;

wherein said at least one inner surface of said container is oriented generally in or parallel to said horizontal plane when said buckets are moved along said first path portion and wherein said at least one inner surface is oriented at an angle to said horizontal plane that is of an amount that is twice said wedge angle when said buckets are moved along said second path portion.

22. A system as claimed in claim 21 further comprising a vertical loading apparatus positioned proximate said second path portion, said vertical loading apparatus operable to load at least one item into each said container when each said container is on said second path portion.

23. A system as claimed in claim 22 wherein when said container is placed into a bucket each said container has first and second opposed open ends, and wherein said system further comprises a folding and sealing station positioned between said feeder and said vertical loading apparatus, said folding and sealing station operable to close a first open end of said container prior to said at least one item being loaded into each container.

24. A system as claimed in claim 22 further comprising a horizontal loading apparatus positioned proximate said first path portion, said horizontal loading apparatus operable to load at least one item into each said container when each said container is moving on said first path portion.

25. A system as claimed in claim 22 further comprising a PLC operable to control the movement of said conveyor and said vertical loading apparatus.

26. A system for loading at least one item into each of a plurality of containers, said system comprising:

(i) a magazine for holding a plurality of container blanks, each said container blank having a plurality of connected side walls and a plurality of flaps extending from ends of said side walls;

(ii) a bucket having a supporting surface configured for supporting at least one of said container blanks;

(iii) a conveyor having an inclined axis of rotation, said conveyor connected to said bucket so that said bucket is oriented at an angle to said conveyor, and operable to move said bucket along a first path portion and a second path portion;

(iv) a feeder for transferring a container blank from said magazine to said bucket in said first path portion with a side wall of said transferred container blank supported atop said supporting surface, said transferred container blank supported in a tubular configuration defining first and second end openings, said plurality of flaps extending from said side walls adjacent said first end opening;

(v) a folding station proximate said first path portion for folding a flap of said plurality of flaps as said bucket is moved along said first path portion;

wherein, while said bucket moves along said second path portion, said second end opening faces upwardly to receive an item when said bucket is moved along said second path portion.

\* \* \* \* \*